United States Patent [19]
Ault et al.

[11] Patent Number: 5,523,032
[45] Date of Patent: *Jun. 4, 1996

[54] METHOD FOR FIBERIZING MINERAL MATERIAL WITH ORGANIC MATERIAL

[75] Inventors: Patrick L. Ault; Michael T. Pellegrin; James E. Loftus, all of Newark, Ohio

[73] Assignee: Owens-Corning Fiberglas Technology, Inc., Summit, Ill.

[ * ] Notice: The term of this patent shall not extend beyond the expiration date of Pat. No. 5,523,031.

[21] Appl. No.: 363,471

[22] Filed: Dec. 23, 1994

[51] Int. Cl.⁶ ............................. C03B 37/04; D01D 5/00
[52] U.S. Cl. ...................... 264/6.000; 65/455; 65/460; 264/8; 264/115; 264/121; 264/122; 264/211.1; 264/211.11
[58] Field of Search ................ 264/6, 8, 115, 264/121, 122, 211.1, 211.11; 65/447, 450, 451, 455, 460

[56] References Cited

U.S. PATENT DOCUMENTS

| | | | |
|---|---|---|---|
| 2,944,284 | 7/1990 | Tillotson et al. | 65/447 |
| 3,830,638 | 8/1974 | Jumentier et al. | 65/518 |
| 4,224,373 | 9/1980 | Marzocchi | 428/288 |
| 4,756,732 | 7/1988 | Barthe et al. | 65/461 |
| 4,759,785 | 7/1988 | Barthe et al. | 65/461 |
| 4,759,974 | 7/1988 | Barthe et al. | 428/224 |
| 5,232,638 | 8/1993 | Thiessen et al. | 264/6 |
| 5,242,633 | 9/1993 | Book et al. | 264/8 |

FOREIGN PATENT DOCUMENTS

| | | |
|---|---|---|
| 998398 | 2/1983 | U.S.S.R. . |
| 1477700 | 5/1989 | U.S.S.R. . |
| 952793 | 3/1964 | United Kingdom ...... 264/8 |

*Primary Examiner*—Leo B. Tentoni
*Attorney, Agent, or Firm*—C. M. Gegenheimer; Ted C. Gillespie

[57] ABSTRACT

A method for fiberizing mineral material with organic material includes centrifuging mineral fibers from molten mineral material with a first rotating spinner, changing the direction of the mineral fibers to form a downwardly moving veil of mineral fibers, establishing a flow of molten organic material moving toward a second rotating spinner positioned within the veil, dividing the flow of molten organic material into a plurality of streams, directing, by means of conduits, individual ones of the plurality of streams toward the peripheral wall of the second rotating spinner, the conduits shielding the molten organic material from heat from the first rotating spinner, and centrifuging organic fibers from the molten organic material.

15 Claims, 3 Drawing Sheets

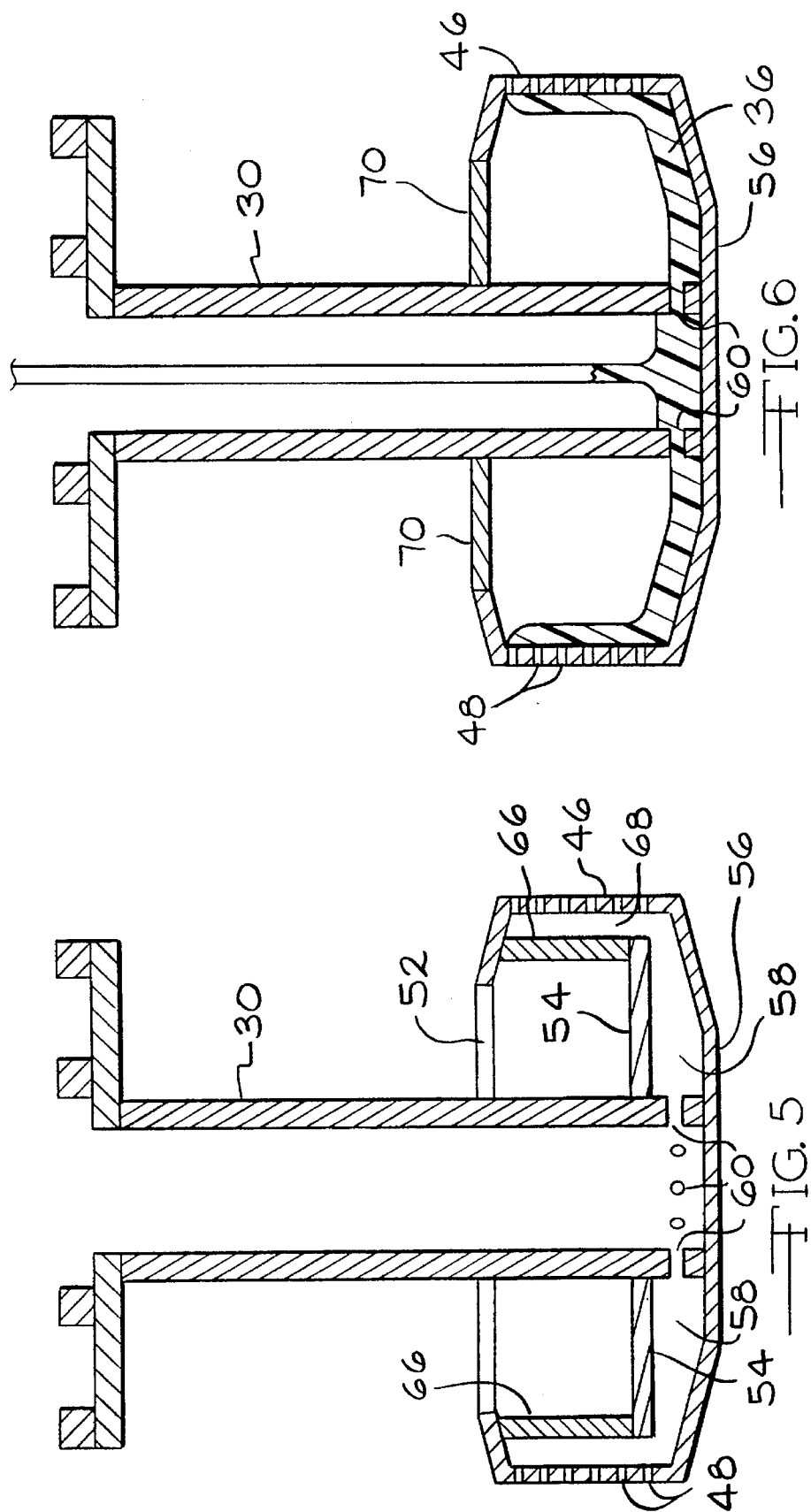

METHOD FOR FIBERIZING MINERAL MATERIAL WITH ORGANIC MATERIAL

TECHNICAL FIELD

This invention relates to the production of mineral fiber products, and in particular, mineral fiber products having organic or polymeric material applied to the mineral fibers. More particularly, this invention relates to simultaneously centrifuging fibers from molten mineral material and molten organic material.

BACKGROUND

Mineral fibers, such as glass fibers, are useful for insulation and structural products. Glass fibers for such products are typically made by feeding molten glass into a spinner, and centrifuging the fibers by rotating the spinner to form a downwardly moving cylindrical veil of glass fibers. Applied to the fibers are various organic coatings, particularly binders for connecting the mineral fibers to each other to form insulation or structural products. Glass fiber insulation products are typically bonded together by urea phenol/formaldehyde binder to form a spring-like matrix which can recover after compression during packaging of the product Typical urea phenol/formaldehyde binders have a molecular weight of about 600 in the uncured state, and these binders are usually applied in an aqueous medium by spraying onto the glass fibers shortly after the fibers are formed.

One of the problems with applying aqueous organic binders of the prior art to cylindrical veils of mineral fibers is that a portion of the binder tends to evaporate prior to contact between the liquid binder drop and a mineral fiber in the veil. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect.

A recently developed process to apply higher molecular weight binders to glass fibers uses a first spinner to produce a downwardly moving veil of glass fibers and a second spinner, positioned within the veil, to form polymer fibers and to distribute them into contact with the glass fibers in the veil. This process produces a commingled insulation pack having some polymer fibers and some glass fibers having a polymer coating. This cofiberizing process is described in U.S. patent application Ser. No. 08/079,413, which is hereby incorporated by reference, and which was filed Jun. 23, 1993, naming Bakhshi et al. as inventors, and is assigned to the assignee of the present invention.

One of the problems with the cofiberizing approach to intermingling polymeric or organic material with glass fibers is that the polymeric material is exposed to a hostile environment. The polymer spinner is of necessity positioned directly beneath the glass spinner in order to have the polymer material intersecting the veil of glass fibers at a high enough level for effective commingling. The glass spinner is operated at nearly 2000° F. and a considerable amount of heat is radiated toward the polymer spinner and the polymer material within the spinner. Excessive heating of the polymer material causes degradation of the polymer. Even more troublesome is the problem of fires. If the polymeric material is exposed to air and elevated temperatures, a portion of the polymeric material will vaporize and the combustion process will commence. Burning polymeric material is an unacceptable side effect of the process. It would be advantageous for a cofiberizing process to be able to deliver the polymeric material to the spinner in a manner which minimizes the thermal degradation of the polymeric material, and which reduces the exposure of molten polymeric material to air to prevent combustion.

DISCLOSURE OF INVENTION

There has now been developed a method and apparatus for improving a cofiberiziing process by shielding the molten polymeric material in the polymer spinner from exposure to some of the heat of the glass spinner, and from contact with air to prevent fires.

According to this invention, there is now provided a method for manufacturing a mineral fiber product comprising centrifuging mineral fibers from molten mineral material with a first rotating spinner, changing the direction of the mineral fibers to form a downwardly moving veil of mineral fibers, establishing a flow of molten organic material moving toward a second rotating spinner positioned within the veil, dividing the flow of molten organic material into a plurality of streams, directing, by means of conduits, individual ones of the plurality of streams toward the peripheral wall of the second rotating spinner, the conduits shielding the molten organic material from heat from the first rotating spinner, and centrifuging organic fibers from the molten organic material. By shielding the molten organic material from heat, the organic material is less subject to thermal degradation, and the molten organic material can be maintained at a relatively cool temperature until the last moment, just before going through the spinner peripheral wall. By shielding the organic material from exposure to air, there is likely to be less chance of fire.

In a specific embodiment of the invention, the conduits are rotating at the same speed or rotational rate as the second rotating spinner.

In another embodiment of the invention, the conduits have conduit outlets which restrict the flow of molten material through the conduits so that no air enters the conduits, thereby preventing or reducing the amount of vaporization of polymeric material.

In yet another embodiment of the invention, a generally circular shield is positioned above the second spinner bottom wall, the shield extending radially outwardly from the spindle toward the peripheral wall of the second spinner, the shield and the spinner bottom wall defining an annular cavity having at least one cavity outlet positioned at the radially outward edge of the shield, and the flow of molten organic material through the cavity outlet being restricted so that no air enters the cavity.

According to this invention, there is also provided apparatus for fiberizing mineral material with organic material comprising a first spinner mounted for rotation about an axis to form mineral fibers, means for changing the direction of the mineral fibers to form a downwardly moving veil of mineral fibers, a second spinner mounted for rotation and positioned within the veil, means for establishing a flow of molten organic material moving toward the second rotating spinner, means for dividing the flow of molten organic material into a plurality of streams, conduits for directing individual ones of the plurality of streams toward the peripheral wall of the second rotating spinner, the conduits shielding the molten organic material from heat from the first rotating spinner, and means for rotating the second spinner to centrifuge organic fibers from the molten organic material and to direct the organic fibers into contact with the veil of mineral fibers.

BRIEF DESCRIPTION OF DRAWINGS

FIG. 5 is a schematic cross-sectional view in elevation of an embodiment of the polymer spinner which contains a circular shield and a vertical interior wall.

FIG. 6 is a schematic cross-sectional view in elevation of an embodiment of the polymer spinner which contains a spinner cover.

BEST MODE FOR CARRYING OUT THE INVENTION

The invention will be described in terms of a glass fiber forming operation, although it is to be understood that the invention can be practiced using other heat softenable mineral material, such as rock, slag, and basalt.

Figure 1:
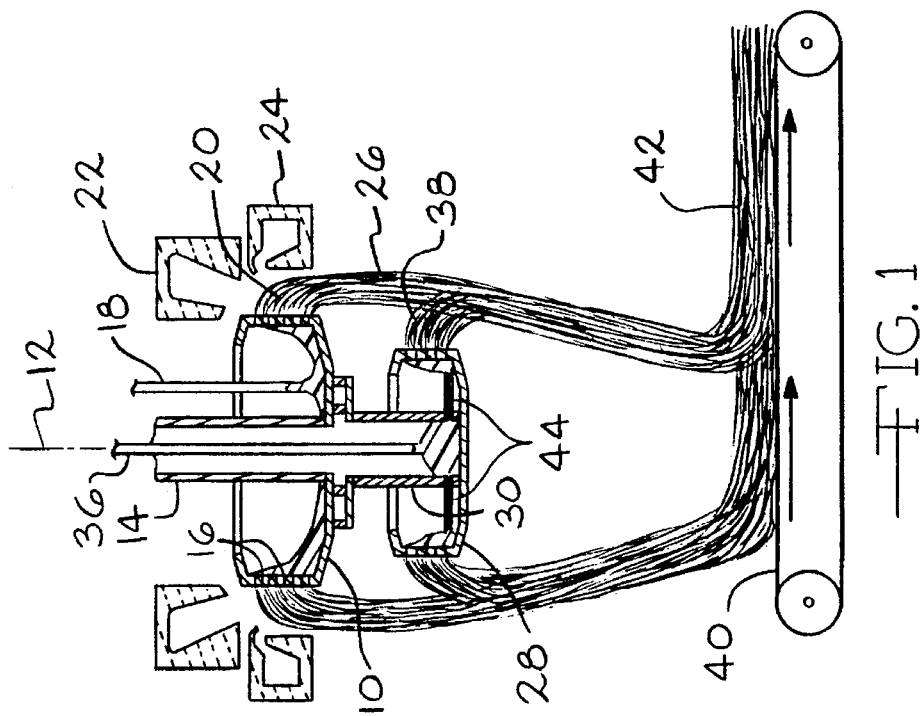
FIG. 1 is a schematic cross-sectional view in elevation of apparatus for cofiberizing glass fibers and fibers of polymeric material according to the invention.

As shown in FIG. 1, glass spinner 10 rotates about axis of rotation 12 and is driven by the rotation of spindle 14. The glass spinner can be cast from a nickle/cobalt/chromium alloy as is commonly known in the art. The spinner peripheral wall has numerous orifices 16 for the centrifugation of glass fibers, and preferably has between about 2,000 and about 50,000 orifices.

The glass spinner is supplied by molten stream of glass 18, which is centrifuged through the walls of the spinner in the form of glass fibers 20. The glass fibers are maintained in a soft, attenuable state immediately outside the spinner by the heat from annular burner 22, although in some glass fiber operations an external burner is not required. The radially-traveling glass fibers are turned down by annular blower 24 into a cylindrically shaped veil 26 of fibers, traveling downwardly, i.e., in the direction of the axis of the spinner. The process for creating the downwardly moving cylindrical veil of glass fibers is well known in the art.

Positioned beneath the glass spinner is a second rotating spinner for distributing molten organic material into contact with the veil from a position within the veil. In the embodiment shown in FIG. 1, the second spinner is a polymer spinner 28, for distributing polymeric material into contact with the veil. The polymer spinner can be cast from nickle/cobalt/chromium alloy as used for the production of glass fibers, or can be any other suitable spinner such as one from welded stainless steel. The polymer spinner peripheral wall has numerous orifices for the centrifugation of asphalt fibers, and preferably has between about 500 and about 25,000 orifices. A polymer spinner successfully used in a glass fiber/PET cofiberizing process had approximately 3,500 orifices.

It is to be understood that any organic material capable of being fiberized can be supplied to the second or polymer spinner. Particularly useful examples of polymers include such higher molecular weight polymeric material as polyethylene terephthalate (PET), polypropylene or polyphenylene sulfide (PPS). Other organic materials suitable for making fibers include nylon, polycarbonate, polystyrene, polyamide, resins, various polyolefins, asphalts and other thermoplastic and thermoset materials.

Figure 2:
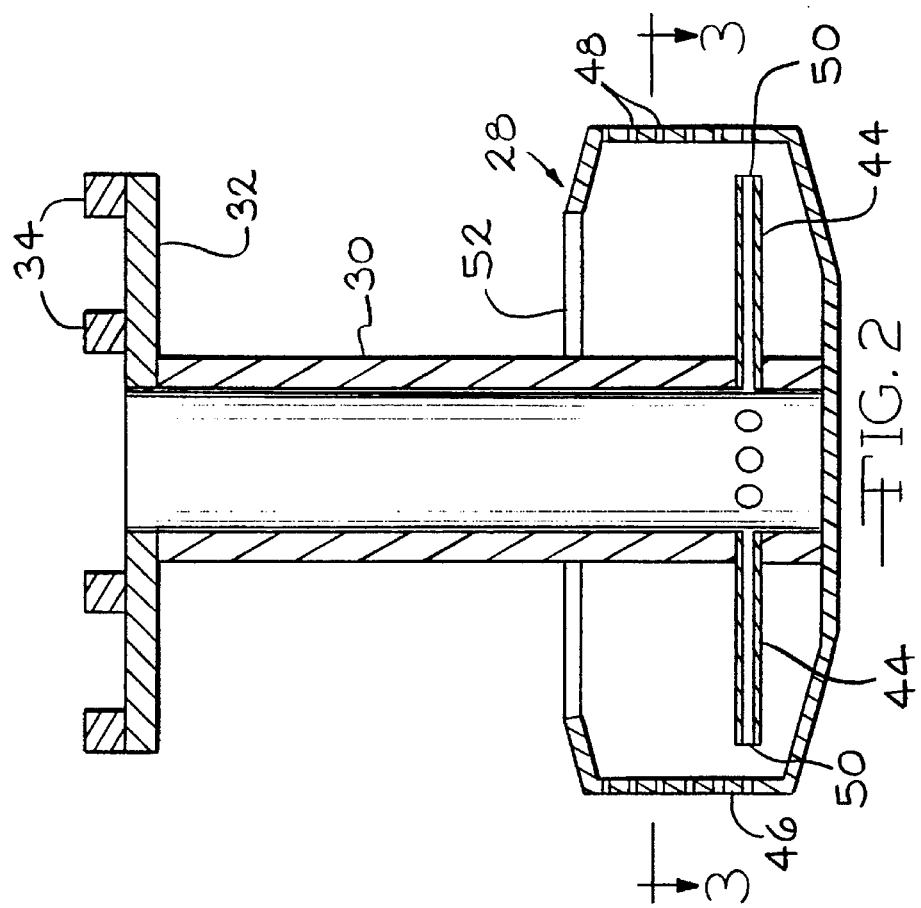
FIG. 2 is a schematic cross-sectional view in elevation of the polymer spinner of FIG. 1, without molten polymer.

The polymer spinner can be mounted on or attached to the glass spinner. Preferably, the polymer spinner is mounted, via polymer spindle 30, in a manner which minimizes physical contact with the glass spinner to reduce the thermal heat transfer by conduction to the polymer material and the polymer spinner. To that end, the polymer spindle is preferably adapted with a mounting bracket 32 having spacing nubs 34 to reduce conductive heat transfer from the glass spinner, as shown in FIG. 2. The spindle length is sufficient to enable the introduction of the polymer fibers at a desirable height in the veil. If the polymer spinner is too high, the polymer fibers may be degraded and may penetrate and flow through the veil.

The polymer material is supplied to the polymer spinner in the form of stream 36 of molten polymer material. As shown, this stream can be feed through the hollow portion of the spindle. The molten polymer can be produced or supplied by using extruder equipment commonly known to those in the art of polymeric materials, such as PET. The temperature at which the molten polymer material is supplied depends upon the nature of the polymer. Polypropylene is typically has a temperature of about 500° F. as it emerges from the extruder. Asphalt runs cooler at about 400° F., while PPS runs hotter at about 600° F.

Depending on the viscosities, surface tension and other parameters of the polymeric material, and on the rotation rate and orifice sizes of the polymer spinner, polymer fibers 38 may be produced from the polymer spinner. The polymer fibers travel radially outwardly where they meet and intermingle with the mineral fibers. The intermingled glass fibers and polymer fibers can be collected on any suitable device, such as conveyor 40 and formed into a commingled product or mat 42.

Since the glass fibers and glass spinners operate at a temperature of approaching 2,000° F., the polymer fibers are rapidly thrust into a region of high temperature, causing the polymer fibers to soften. It has been found that some of the polymer fibers melt, forming droplets or other particles which attach themselves to some of the mineral fibers. Others of the polymer fibers retain their fibrous shape, resulting in the presence of polymer fibers in the final mineral fiber product. The reason that some of the polymeric material retains its fibrous shape, while other portions of the material form polymeric particles which attach themselves to the mineral fibers, is not known. It may be that some of the polymer fibers do not soften to the extent required to cause them to lose their fibrous shape and turn into a more spherical shape. Alternatively, it may be that although all polymer fibers are softened, only a portion of them come into contact with mineral fibers while in a softened condition.

Figure 3:
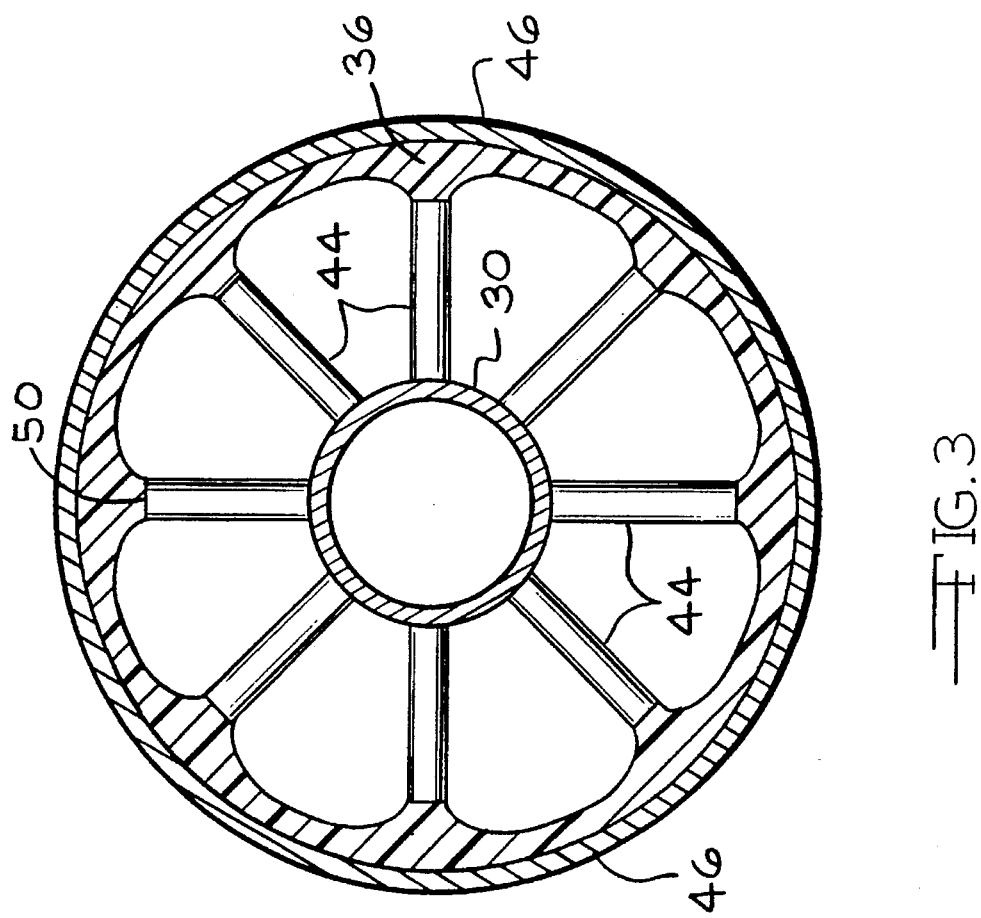
FIG. 3 is a schematic plan view of the polymer spinner of FIG. 1, taken along lines 3—3 of FIG. 2, showing molten polymer in the polymer spinner.

The delivery of the polymeric material within the polymer spinner is facilitated by causing the polymeric material to flow within conduits, such as pipes 44. As shown in FIGS. 2 and 3, the pipes extend radially outwardly from the polymer spindle toward polymer spinner peripheral wall 46. In operation, the polymeric material flows downwardly in the polymer spindle, and radially outwardly through the pipes. The molten polymeric material forms a layer or head on the spinner peripheral wall, and is centrifuged through polymer orifices 48 to form the polymer fibers.

The pipes have outlets 50, which can be merely the open ends of the pipes, or can be a means for restricting or metering the flow of polymeric material flowing through the pipes. Preferably the pipe outlet and pipe diameter are sized appropriately for the operating conditions to insure that no air can enter the pipes. By preventing air from reaching the polymeric material within the pipes, degradation of the polymeric material will be delayed until after the polymeric material exits the pipes. Optionally, the pipe outlets can be adapted with nozzles.

The pipes can be any conduits suitable for delivery of the polymeric material. Pipes successfully used in a commingling process with PET were one-quarter inch inside diameter stainless steel tubes. Preferably there are at least four pipes, and most preferably eight pipes, although more or less can be employed. The pipes can be mounted for rotation at the same rotational rate as the polymer spinner, or at a different rate. Optionally, the pipes can be insulated, with a ceramic material or any other suitable material, to further minimize the effects of radiant heat and hot gases entering the polymer spinner through the spinner top opening 52.

Figure 4:
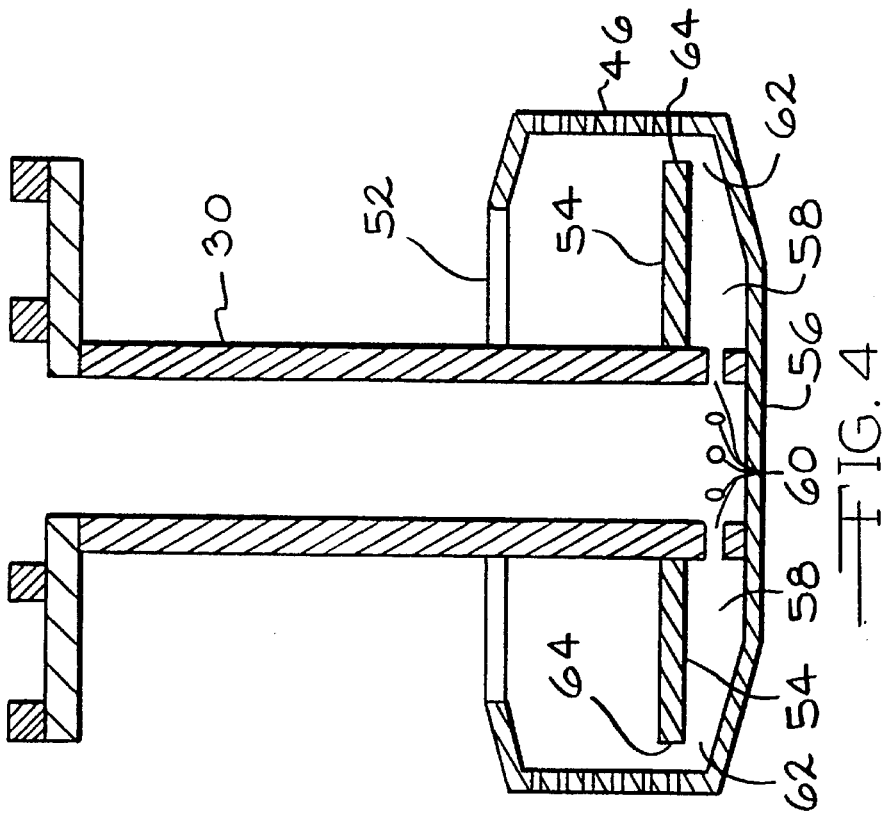
FIG. 4 is a schematic cross-sectional view in elevation of an embodiment of the polymer spinner which contains a circular shield.

As shown in FIG. 4, the polymer spinner can be adapted with a generally flat plate-like member to cover the molten polymeric material to minimize the exposure to heat. This member can be anything suitable to protect the polymeric material, such as shield 54, which can be made of stainless steel or any other appropriate material. The shield can be generally annular in shape, extending radially outwardly from the polymer spindle 30 toward the polymer spinner peripheral wall. The shield and the polymer spinner bottom wall 56 define a generally annular space or cavity 58 on the bottom of the spinner. During operation, the polymeric material will flow through spindle openings 60 to fill the cavity. The shield can be designed to provide a narrow opening, cavity outlet 62, at the radially outward shield edge 64. The cavity outlet can restrict the flow of polymeric material toward the polymer spinner peripheral wall, in a manner similar to the function of the pipe outlets. The cavity outlet can be annular in shape, or can be a series of slots circumferentially spaced around the shield. A prime function of the cavity outlet is to prevent air from reaching the cavity so that a minimum of polymer degradation takes place. Degradation leads to vaporization and possible fire problems.

An alternative embodiment of the invention, shown in FIG. 5, provides for an extension at the end of the shield to further block exposure of the polymeric material to air and heat from sources external to the polymer spinner. Vertical interior wall 66 can be positioned radially inwardly from the polymer spinner peripheral wall to define annular vertical cavity 68 where a body or head of polymeric material can accumulate without exposure to air.

As shown in FIG. 6, the shielding of the polymeric material can be accomplished by positioning a blocking means, such as spinner cover 70, at the top of the polymer spinner. As shown, the molten polymeric material drops downwardly through the polymer spindle, flows through the spindle openings into the spinner flows radially outwardly on the polymer spinner bottom wall and up the peripheral wall, and through the orifices to form polymer fibers.

It will be evident from the foregoing that various modifications can be made to this invention. Such, however, are considered as being within the scope of the invention.

INDUSTRIAL APPLICABILITY

The invention can be useful in the production of fibrous products of commingled glass and polymer fibers for use as structural and thermal insulation products.

We claim:

1. The method for fiberizing mineral material with organic material comprising:
   a. centrifuging mineral fibers from molten mineral material with a first rotating spinner;
   b. changing the direction of the mineral fibers to form a downwardly moving veil of mineral fibers;
   c. establishing a flow of molten organic material moving toward a second rotating spinner positioned within the veil;
   d. dividing the flow of molten organic material into a plurality of streams;
   e. directing, by means of conduits, individual ones of the plurality of streams toward the peripheral wall of the second rotating spinner, the conduits shielding the molten organic material from heat from the first rotating spinner;
   f. centrifuging organic fibers from the molten organic material, and,
   g. directing the organic fibers into contact with the veil of mineral fibers.

2. The method of claim 1 in which the conduits are rotating at the same speed as the second rotating spinner.

3. The method of claim 2 in which the conduits are insulated.

4. The method of claim 1 in which the conduits have conduit outlets, and including the step of restricting the flow of molten organic material through the conduit outlets so that no air enters the conduits.

5. The method for fiberizing mineral material with organic material comprising:
   a. centrifuging mineral fibers from molten mineral material with a first rotating spinner;
   b. changing the direction of the mineral fibers to form a downwardly moving veil of mineral fibers;
   c. establishing a flow of molten organic material moving toward a second rotating spinner positioned within the veil;
   d. dividing the flow of molten organic material into a plurality of streams;
   e. directing, by means of conduits, individual ones of the plurality of streams toward the peripheral wall of the second rotating spinner, the conduits having conduit outlets;
   f. restricting the flow of molten material through the conduit outlets so that no air enters the conduits;
   g. centrifuging organic fibers from the molten organic material; and,
   h. directing the organic fibers into contact with the veil of mineral fibers.

6. The method of claim 5 in which the conduits are rotating at the same rotational rate as the second rotating spinner.

7. The method of claim 5 in which the conduits act to shield the molten organic material from heat from the first rotating spinner.

8. The method of claim 7 in which the conduits are insulated.

9. The method for fiberizing mineral material with organic material comprising:
   a. centrifuging mineral fibers from molten mineral material with a first rotating spinner;
   b. changing the direction of the mineral fibers to form a downwardly moving veil of mineral fibers;

c. rotating a second spinner positioned within the veil and rotatably mounted on a hollow spindle, the second spinner having a peripheral wall, a bottom wall, and a generally circular shield positioned above the bottom wall, the shield extending radially outwardly from the spindle toward the peripheral wall of the second spinner, the shield and the spinner bottom wall defining an annular cavity having at least one cavity outlet positioned at the radially outward edge of the shield:

d. establishing a flow of molten organic material moving downwardly through the spindle:

e. directing the molten organic material from the spindle into the cavity and through the cavity outlet toward the spinner peripheral wall;

f. restricting the flow of molten material through the cavity outlet so that no air enters the cavity;

g. centrifuging organic fibers from the molten organic material; and, h. directing the organic fibers into contact with the veil of mineral fibers.

10. The method of claim 9 in which the shield acts to shield the molten organic material from heat from the first rotating spinner.

11. The method of claim 9 in which the cavity outlet is an annular slot.

12. The method of claim 9 in which the shield has an annular flange extending vertically upward to define an annular vertical cavity which shields the molten organic material positioned on the spinner peripheral wall from heat from the first rotating spinner.

13. The method of claim 9 in which the shield is insulated.

14. The method for fiberizing mineral material with organic material comprising:

a. centrifuging mineral fibers from molten mineral material with a first rotating spinner;

b. changing the direction of the mineral fibers to form a downwardly moving veil of mineral fibers;

c. rotating a second spinner positioned within the veil and rotatably mounted on a hollow spindle, the second spinner having a peripheral wall, a bottom wall, and a generally circular shield oriented generally parallel to the bottom wall, the shield extending radially outwardly from the spindle toward the top of the peripheral wall of the second spinner, the shield being effective to block hot gases and radiant heat from entering the second spinner;

d. establishing a flow of molten organic material moving downwardly through the spindle;

e. directing the molten organic material from the spindle toward the spinner peripheral wall;

f. centrifuging organic fibers from the molten organic material; and, directing the organic fibers into contact with the veil of mineral fibers.

15. The method of claim 14 in which the shield is insulated.

* * * * *